US009951798B2

United States Patent
Steinhilber

(10) Patent No.: US 9,951,798 B2
(45) Date of Patent: Apr. 24, 2018

(54) DEVICE FOR CONTROLLING THE MOVEMENT OF A HYDRAULIC CYLINDER, PARTICULARLY FOR HYDRAULIC MACHINES

(71) Applicant: ALSTOM Renewable Technologies, Grenoble (FR)

(72) Inventor: Armin Steinhilber, Claix (FR)

(73) Assignee: GE Renewable Technologies, Grenoble (FR)

( * ) Notice: Subject to any disclaimer, the term of this patent is extended or adjusted under 35 U.S.C. 154(b) by 553 days.

(21) Appl. No.: 14/592,180

(22) Filed: Jan. 8, 2015

(65) Prior Publication Data

US 2015/0122114 A1    May 7, 2015

Related U.S. Application Data

(63) Continuation of application No. PCT/EP2013/064818, filed on Jul. 12, 2013.

(30) Foreign Application Priority Data

Jul. 13, 2012   (FR) ..................... 12 56784

(51) Int. Cl.
*F15B 13/04*    (2006.01)
*F03B 11/00*    (2006.01)
*F03B 3/18*    (2006.01)

(52) U.S. Cl.
CPC .......... *F15B 13/0402* (2013.01); *F03B 3/183* (2013.01); *F03B 11/004* (2013.01);
(Continued)

(58) Field of Classification Search
CPC ............. F15B 2211/30525; F15B 2211/30565
(Continued)

(56) References Cited

U.S. PATENT DOCUMENTS 3,596,560 A * 8/1971 Butterworth ........ F15B 11/0426
                                                            137/625.67
5,960,695 A * 10/1999 Aardema ............... F15B 11/006
                                                            137/596.17
2013/0098237 A1* 4/2013 Pavillet ................... F03B 3/183
                                                            91/508

FOREIGN PATENT DOCUMENTS

CN       1162348 A    10/1997
CN    201396344 Y    2/2010
(Continued)

OTHER PUBLICATIONS

Machine Translation of WO2006121366.*
(Continued)

*Primary Examiner* — F. Daniel Lopez
*Assistant Examiner* — Daniel Collins
(74) *Attorney, Agent, or Firm* — Dority & Manning, P.A.

(57) ABSTRACT

A control device includes a valve, having a body connected to the first chamber of a cylinder via a first hydraulic connection and to the second chamber of the cylinder via a second hydraulic connection. The control device includes a first hydraulic duct connected to a first actuating-fluid source, and a second hydraulic duct connected to a second actuating-fluid source. The hydraulic ducts communicate with the body of the valve. The valve further includes a distribution device that is movable within the body of the valve, between a first position, in which the distribution device places the first hydraulic connection and the first hydraulic duct in fluid communication, and a second position, in which the distribution device places the second hydraulic connection and the second hydraulic duct in fluid communication.

9 Claims, 2 Drawing Sheets

(52) U.S. Cl.
CPC .................. *F15B 2013/041* (2013.01); *F15B 2211/20592* (2013.01); *F15B 2211/31582* (2013.01); *Y02E 10/226* (2013.01)

(58) Field of Classification Search
USPC .......................................... 91/463, 465, 466
See application file for complete search history.

(56) References Cited

FOREIGN PATENT DOCUMENTS

| EP | 1 167 778 A1 | 1/2002 | | |
|----|----|----|----|----|
| JP | H08-6647 A | 1/1996 | | |
| JP | H10-184938 A | 7/1998 | | |
| JP | H10-213237 A | 8/1998 | | |
| JP | 2002-206659 A | 7/2002 | | |
| JP | 2011-122469 A | 6/2011 | | |
| RU | 2 250 390 C2 | 4/2005 | | |
| WO | 2005/121564 A1 | 12/2005 | | |
| WO | WO2006121366 | * | 11/2006 | ................ F15B 9/03 |
| WO | 2011/089361 A1 | 7/2011 | | |

OTHER PUBLICATIONS

Office Action and Search issued in connection with corresponding RU Application No. 2015104866 dated May 17, 2017.
Notification of Reason for Refusal issued in connection with corresponding JP Application No. 2015-521019 dated Jun. 13, 2017.
Decision to Grant issued in connection with corresponding JP Application No. 2015-521019 dated Aug. 8, 2017.

* cited by examiner

DEVICE FOR CONTROLLING THE MOVEMENT OF A HYDRAULIC CYLINDER, PARTICULARLY FOR HYDRAULIC MACHINES

CROSS-REFERENCE TO RELATED APPLICATIONS

This application claims priority to PCT/EP2013/064818 filed Jul. 12, 2013, which claims priority to French application 1256784 filed Jul. 13, 2012, both of which are hereby incorporated in their entireties.

TECHNICAL FIELD

The present invention relates to a control device controlling the movement of a hydraulic cylinder of the type comprising a body forming a first chamber and a second chamber which are designed to receive an actuating fluid, said chambers being separated from one another by a piston able to move in the body in a first direction in which the volume of the first chamber increases while the volume of the second chamber decreases, and in a second direction in which the volume of the second chamber increases while the volume of the first chamber decreases, the control device comprising a valve comprising a body connected to the first chamber of the cylinder by a first hydraulic connection and to the second chamber of the cylinder by a second hydraulic connection.

The invention also relates to a control system controlling the movement of a ring gate of a hydraulic machine comprising such a control device and to a hydraulic machine comprising such a control system.

BACKGROUND

A hydraulic machine, of the turbine, pump or turbine-pump type generally comprises a runner and a ring gate allowing control over the supply of water to the runner. To do that, the ring gate is able to move between an open position, in which it allows water to pass from a duct supplying the runner, and a closed position in which it closes the duct. The movement of such a ring gate is controlled, in the known way, by a plurality of hydraulic cylinders the rods of which are connected to the ring gate and movements of which are controlled by means of a valve. The movement of the rods in the cylinders therefore causes the movement of the ring gate in the duct supplying the runner. When the pistons of the cylinders, and therefore the rods, move in a first direction, the pistons lift the ring gate toward its open position and when they move in a second direction, the opposite of the first direction, the ring gate is lowered toward its closed position.

It will be readily understood that, for large hydraulic machinery, in which the ring gate is very heavy and bulky, movement toward the closed position requires significantly less force than movement toward the open position during which the ring gate is raised, because of the weight of this ring gate.

It is therefore necessary to supply the cylinders at a higher pressure when the pistons are being moved in the first direction than when they are being moved in the second direction.

The known control devices, which propose to solve this problem by allowing the supply to the cylinders to be switched between a first pressure and a second pressure, are complicated and require the addition of numerous components in addition to the control valve. These components require tricky settings and painstaking maintenance interventions.

SUMMARY

One of the objects of the invention is to alleviate these disadvantages by proposing a control device that in a simple and reliable manner allows the supply to a cylinder to be switched between a first pressure and a second pressure and which does not require the addition of components to the control device.

To that end, the invention relates to a control device of the abovementioned type, in which the valve further comprises a first hydraulic duct intended to be connected to a first source of actuating fluid, and a second hydraulic duct intended to be connected to a second source of actuating fluid, said hydraulic ducts being in communication with the body of the valve, said valve further comprising a distribution device able to move in the body of the valve between a first position in which the distribution device places the first hydraulic connection and the first hydraulic duct in fluidic communication, and a second position in which the distribution device places the second hydraulic connection and the second hydraulic duct in fluidic communication.

Thus, the switch from a first supply pressure to a second supply pressure supplied to the cylinder is performed in a simple way by having the distribution device switched from its first position into its second position allowing the first chamber of the cylinder to be connected to the first source of actuating fluid and allowing the second chamber of the cylinder to be connected to the second source of actuating fluid, respectively, and by planning for these sources to inject the actuating fluid at different pressures. The control device is therefore particularly simple and does not require the addition of additional components outside of the valve. The invention allows the cylinder to be supplied at two different pressures simply by modifying the structure of the valve that controls the movement of this cylinder.

According to other features of the control device according to the invention:
- the distribution device prevents fluidic communication between the first hydraulic connection and the second hydraulic duct and between the second hydraulic connection and the first hydraulic duct whatever the position of said distribution device;
- the device comprises a first source of actuating fluid, connected to the first hydraulic duct of the valve and arranged to inject the actuating fluid into the body of the valve at a first pressure, and a second source of actuating fluid connected to the second hydraulic duct and arranged to inject the actuating fluid into the body of the valve at a second pressure, the first pressure being higher than the second pressure;
- the first pressure is substantially between 60 bar and 250 bar and the second pressure is substantially between 10 bar and 70 bar;
- the device further comprises at least one reservoir of actuating fluid connected to the body of the valve, the distribution device placing the second hydraulic connection in fluidic communication with said reservoir when it is in its first position, so as to discharge the actuating fluid from the second chamber of the cylinder when the piston moves in the first direction, and placing the first hydraulic connection in fluidic communication with said reservoir when it is in its second position, so as to discharge the actuating fluid from the first chamber of the cylinder when the piston moves in the second direction;

the valve comprises a first compartment connecting the first hydraulic connection to the first hydraulic duct and a second compartment connecting the second hydraulic connection to the second hydraulic duct, the distribution device being arranged to open the first compartment and close the second compartment when it is in its first position and to open the second compartment and close the first compartment when it is in its second position;

the valve comprises means of controlling the movement of the distribution device between its first and its second positions, said means comprising thrust means pushing the distribution device from its first position toward its second position and restraining means exerting restraint on the distribution device tending to return it toward its first position.

The invention also relates to a system for controlling the movement of a ring gate of a hydraulic machine of the type comprising a runner, the ring gate defining a closed contour and being able to move between a position of opening and a positioning of closing at least one pipeline supplying the runner with water, the system comprising at least one hydraulic cylinder, comprising a body forming a first chamber and a second chamber which are designed to receive an actuating fluid, said chambers being separated from one another by a piston able to move in the body in a first direction in which the volume of the first chamber increases while the volume of the second chamber decreases, and in a second direction in which the volume of the second chamber increases while the volume of the first chamber decreases, a rod being connected to said piston and to the ring gate so that movement of the piston in its first direction leads to a movement of the ring gate toward its open position and movement of the piston in its second direction leads to movement of the ring gate toward its closed position, the system comprising a control device as defined hereinabove, the first hydraulic connection of said device being connected to the first chamber of said cylinder and the second hydraulic connection of said device being connected to the second chamber of said cylinder so as to control the movement of the piston in the first direction and in the second direction through movement of the distribution device between its first and its second positions.

According to another feature of the control system according to the invention, comprising a plurality of hydraulic cylinders, of which the rods are connected to the ring gate and are distributed around the perimeter of said ring gate, the movement of each hydraulic cylinder being controlled by a control device as defined hereinabove.

The invention also relates to a hydraulic machine of the turbine, pump or turbine-pump type, comprising a runner and a ring gate able to move between a position of opening and a position of closing at least one pipeline supplying the runner with water, the hydraulic machine comprising a control system as described hereinabove.

BRIEF DESCRIPTION OF THE DRAWINGS

Other aspects and advantages of the invention will become apparent from reading the following description, given by way of example and made with reference to the attached drawings, in which.

DETAILED DESCRIPTION

Although the description is given with reference to a control system allowing control over the movement of a ring gate of a hydraulic machine, it will be appreciated that the control device of the invention can be adapted to suit other types of control system, whenever a cylinder needs to be supplied alternately with two different pressures according to the direction in which the piston of this cylinder moves.

In the description, the adjective "hydraulic" may refer to a cylinder actuating fluid such as oil, or to water flowing through the hydraulic machine.

Figure 1:
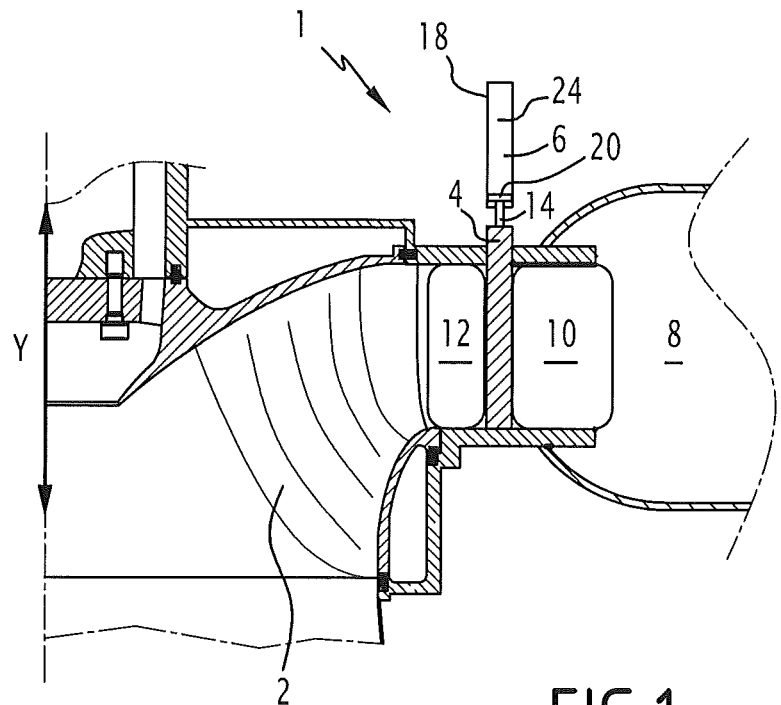
FIG. 1 is a schematic depiction in cross section of a hydraulic machine according to the invention.

With reference to FIG. 1 a description is given of a hydraulic machine 1 comprising a runner 2, a ring gate 4 and at least one hydraulic cylinder 6 belonging to a system controlling the movement of the ring gate 4. The ring gate 4 moves in a main direction Y, for example a vertical direction, between a position of opening and a position of closing a line 8 supplying water to the runner 2. In FIG. 1, the ring gate 4 is in its closed position and closes the line 8. In its open position (not depicted), the ring gate 4 is raised in the direction Y to open a passage between the line 8 and the runner 2. In the case of the hydraulic machine 1, which may be of the turbine, pump or turbine-pump type, the line 8 is formed by a shell referred to as "casing". The ring gate 4 is installed between fixed guide vanes 10 and mobile wicket gates 12 which direct the stream of water toward the runner 2. In a known way, the ring gate has a closed, for example annular, contour and extends about an axis substantially parallel to the direction Y. Its movement may be controlled by a plurality of hydraulic cylinders 6 distributed around the periphery of the ring gate 4. Each cylinder 6 comprises a rod 14 connected to the ring gate 4 and extending in the direction Y of travel of the ring gate 4 so that the movement of the rod 14 causes the ring gate 4 to move.

Such a hydraulic machine 1 and such a ring gate 4 are known and will not be described in greater detail here. A person skilled in the art will be able to refer to document WO-2011/089361 for further details regarding the structure of such a ring gate and the control of the movement thereof between the open position and the closed position using the cylinders 6, and how the movement of these cylinders is synchronized with each other.

The remainder of the description will focus more particularly on describing a device 16 for controlling the movement of one of the cylinders 6 which are used for moving the ring gate 4.

Figure 2:
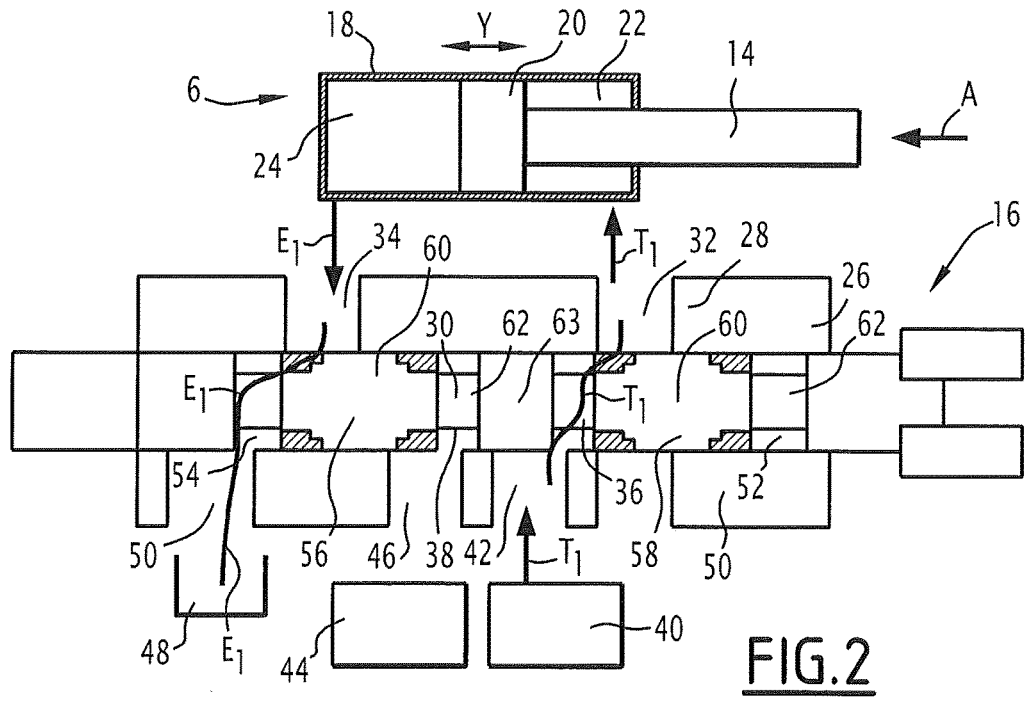
FIG. 2 is a schematic depiction of a control system according to the invention, showing the control device with the distribution device in the first position.
Figure 3:
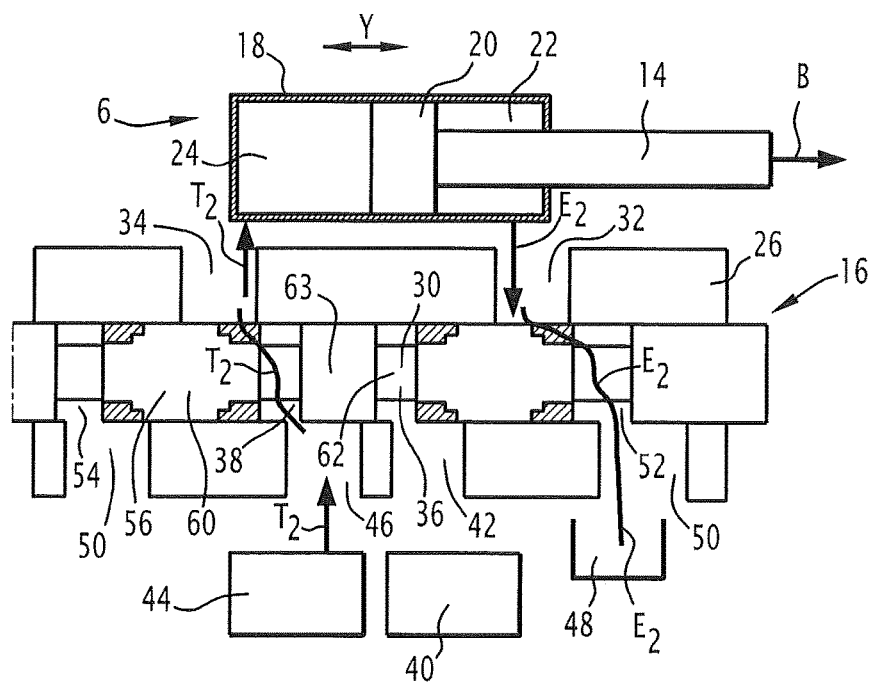
FIG. 3 is a schematic depiction of the control system of FIG. 2, the distribution device being in its second position.

A cylinder 6 and the control device 16 controlling the movement thereof are depicted schematically in FIGS. 2 and 3.

The hydraulic cylinder 6 is a double-acting hydraulic cylinder essentially comprising a body 18 having an internal volume within which a piston 20 is arranged in such a way as to divide the internal volume between a first chamber 22 and a second chamber 24. The piston 20 is secured to the rod 14 which extends in the first chamber 22, while the second chamber 24 extends on the other side of the piston 20 to the rod 14. The piston 20, and therefore the rod 14, is able to move translationally in the body 18 in a first direction, parallel to the main direction Y and depicted by the arrow A in FIG. 1, in which direction the volume of the first chamber 22 increases while the volume of the second chamber 24 decreases, and in a second direction, the opposite to the first direction A, and depicted by the arrow B in FIG. 2, in which direction the volume of the second chamber 24 increases while the volume of the first chamber 22 decreases. When the piston 20 moves in the first direction A, the rod 14 pulls the ring gate 4 to raise it and move it toward its open position, and when the piston 20 moves in the second direction B, the rod 14 pushes the ring gate 4, so as to lower it and move it toward its closed position.

In a known way, the movement of the piston 20 in the first or the second direction is achieved by injecting a control fluid, for example oil, into the first chamber 22 or into the second chamber 24.

This injection is controlled via the control device 16 which will now be described.

The control device 16 comprises a valve 26 provided with a body 28 defining an internal volume 30.

The valve 26 comprises a first hydraulic connection 32 to the first chamber 22 of the cylinder 6 and a second hydraulic connection 34 to the second chamber 24 of the cylinder 6. A "hydraulic connection" means a duct or the like placing the internal volume 30 of the valve 26 in fluidic communication with the first chamber 22 or with the second chamber 24 of the piston. These hydraulic connections are not depicted in detail in the figures and may have any suitable form for connecting the cylinder 6 to the valve 26, giving due consideration to the environment formed by the hydraulic machine 1.

The first hydraulic connection 32 opens into a first compartment 36 defined in the body 28 of the valve 26 and the second hydraulic connection 34 opens into a second compartment 38 defined in the body 28 of the valve 26.

The first compartment 36 is also in fluidic communication with a first source of actuating fluid 40 via a first hydraulic duct 42 and the second compartment 38 is in fluidic communication with a second source of actuating fluid 44 via a second hydraulic duct 46.

The first source of actuating fluid 40 is arranged to inject the actuating fluid into the first compartment 36 at a first pressure. This first pressure is, for example, substantially between 60 bar and 250 bar.

The second source of actuating fluid 44 is arranged to inject the actuating fluid into the second compartment 38 at a second pressure. This second pressure is, for example, substantially between 10 bar and 70 bar.

The first pressure is therefore very much higher than the second pressure, allowing the movement of the piston 20 to be adapted to the forces necessary to move the ring gate 4 as will be described later on. The actuating fluid injected by the first and second sources 40 and 44 is substantially identical and, for example, is oil.

The control device 16 further comprises a reservoir of actuating fluid 48 in communication, via hydraulic ducts 50, with a third compartment 52 and a fourth compartment 54 which are defined in the body 28 of the valve 26 and respectively in fluidic communication with the first hydraulic connection 32 and with the second hydraulic connection 34 so as to place the first chamber 22 and the second chamber 24 of the cylinder 6 in fluidic communication with the reservoir 48 of actuating fluid. According to one embodiment, the control device 16 comprises two reservoirs 48, one to receive the actuating fluid coming from the first chamber 22 and the other to receive the actuating fluid coming from the second chamber 24.

The control device 16 further comprises a distribution device 56 for opening and closing the various fluidic communications between the cylinder 6, the first source of actuating fluid 40, the second source of actuating fluid 44 and the reservoir of actuating fluid 48.

Figure 4:
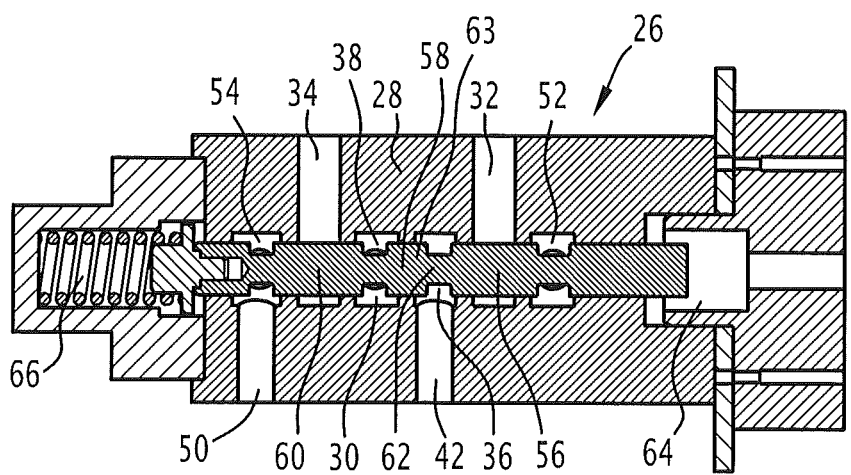
FIG. 4 is a schematic depiction in cross section of the valve of the control device.

To this end, the distribution device 56 is formed of a body 58 able to move in the internal volume 30 of the body 28 of the valve 26 and having large-diameter sections 60, the diameter of which is more or less equal to that of the body 30 of the valve 26, so as to fill the internal volume of the valve 26 at the location of these sections 60, and sections 62 of smaller diameter, the diameter of which is significantly smaller than that of the body 30 of the valve 26 so as to leave part of the internal volume of the valve 26 open at the location of these sections 62, as depicted in FIG. 4. Such a distribution device 56 is formed, for example, as a slide-valve slide.

The body 58 of the distribution device is able to move between a first position (FIG. 2) and a second position (FIG. 3) allowing respectively the supply of the first chamber 22 and the second chamber 24 of the cylinder 6 with actuating fluid.

In the first position, a reduced=diameter section 62 of the body 58 of the distribution device 56 is in the first compartment 36 and in the path between the first hydraulic duct 42, connecting the first source of actuating fluid 40 to the body 28 of the valve, and the first hydraulic connection 32 connecting the first chamber 22 of the cylinder 6 to the body 28 of the valve. Thus, the actuating fluid flows from the first source 40 to the first chamber 22 of the cylinder 6 at the first pressure, as indicated by the references $T_1$ in FIG. 2. The injection of the actuating fluid into the first chamber 22 of the cylinder 6 tends to push the piston 20, and therefore the rod 14, in the first direction A, allowing the ring gate 4 to be raised.

Likewise in the first position, a large-diameter section 60 of the body 58 of the distribution device 56 is in the path between the second hydraulic duct 46, connecting the second source of actuating fluid 44 to the body 28 of the valve 26, and the second hydraulic connection 34 connecting the second chamber 24 of the cylinder 6 to the body 28 of the valve 26. Thus, the second chamber 24 is not supplied with actuating fluid. By contrast, in the first position, a reduced-diameter section 62 is in the path between the hydraulic duct 50, connecting the reservoir 48 to the fourth compartment 54, and the second hydraulic connection 34 so that the actuating fluid leaves the second chamber 24 of the cylinder under the effect of the thrust of the piston 20 in the first direction A and fills the reservoir 48, as indicated by references $E_1$ in FIG. 2.

In the first position, a large-diameter section 60 of the body 58 of the distribution device is in the path between the hydraulic duct 50, connecting the reservoir 48 to the third compartment 52, and the first hydraulic connection 32 so as to prevent actuating fluid from flowing from the first chamber 22 of the cylinder 6 to the reservoir 48.

In the second position, a reduced-diameter section 62 of the body 58 of the distribution device 56 is in the second compartment 38 and in the path between the second hydraulic duct 46, connecting the second source of actuating fluid 44 to the body 28 of the valve, and the second hydraulic connection 34 connecting the second chamber 24 of the cylinder 6 to the body 28 of the valve. Thus, the actuating fluid flows from the second source 44 to the second chamber 24 of the cylinder 6 at the second pressure, as indicated by the references $T_2$ in FIG. 3. Injection of actuating fluid into the second chamber 24 of the cylinder 6 tends to push the piston 20, and therefore the rod 14, in the second direction B, allowing the ring gate 4 to be lowered.

Likewise in the second position, a large-diameter section 60 of the body 58 of the distribution device 56 is in the path between the first hydraulic duct 42, connecting the first source of actuating fluid 40 to the body 28 of the valve 26, and the first hydraulic connection 32 connecting the first chamber 22 of the cylinder 6 to the body 28 of the valve 26. Thus, the first chamber 22 is not supplied with actuating fluid. By contrast, in the second position, a reduced-diameter section 62 is in the path between the hydraulic duct 50, connecting the reservoir 48 to the third compartment 52, and the first hydraulic connection 32 so that the actuating fluid leaves the first chamber 22 of the cylinder under the effect of the thrust of the piston 20 in the second direction B and fills the reservoir 48, as indicated by the references $E_2$ in FIG. 3.

In the second position, a large-diameter section 60 of the body 58 of the distribution device is in the path between the hydraulic duct 50, connecting the reservoir 48 to the fourth compartment 54, and the second hydraulic connection 34 so as to prevent actuating fluid from flowing through the second chamber 22 of the cylinder 6 to the reservoir 48.

The body 58 of the distribution device further comprises a large-diameter central section 63 extending between the first compartment 36 and the second compartment 38 and arranged to prevent any fluidic communication between these compartments whatever the position of the distribution device 56. Thus any fluidic communication between the first hydraulic connection 32 and the second hydraulic duct 46 and between the second hydraulic connection 34 and the first hydraulic duct 42 is prevented. This guarantees that it is impossible for one of the chambers of the cylinder 6 to be supplied from the incorrect source of distribution fluid whatever the position of the distribution device 56. The large-diameter central section 63 is positioned between two reduced-diameter sections 62 respectively allowing actuating fluid to pass between the first hydraulic duct 42 and the first hydraulic connection 32 when the body 58 is in the first position and actuating fluid to pass between the second hydraulic duct 46 and the second hydraulic connection 34 when the body 58 is in the second position.

Movement of the body 58 of the distribution device 56 translationally in the body 30 of the valve 26 between the first position and the second position is driven by control means comprising thrust means 64 for pushing the distribution device 56 from its first position toward its second position and restraining means 66 exerting restraint on the distribution device 56 to tend to return it toward its first position. The thrust means 64 are, for example, formed by a chamber extending in the body 30 of the valve 26 and closed by one end of the body 58 of the distribution device. The chamber is able to be filled with an actuating fluid pushing the body 58 of the distribution device as it fills the chamber. The restraining means 66 are formed, for example, of a spring pressing against the other end of the body 58 of the valve 26 and pushing the body 58 toward it first position when the thrust means 64 are no longer acting on the body 58. The control means further comprise means arranged to trigger the filling and emptying of the chamber that forms the thrust means 64. The control means may further comprise for example a position sensor sensing the position of the body 58 in the body 28 of the valve 26. The control means may adopt forms other than that described hereinabove, such as the form of an actuating cylinder or the like.

The control device described hereinabove therefore allows the first chamber 22 of the cylinder 6 to be supplied with an actuating fluid at high pressure, thus making it possible to overcome the forces needed to raise the ring gate toward its open position and to supply the second chamber 24 of the cylinder 6 with an actuating fluid at low pressure, sufficient to allow the ring gate to be lowered toward its closed position under the effect of its own weight. This control device is particularly simple to use and allows a switchover from a high pressure supply to a low pressure supply very quickly and without the need for complex controls. The control device notably comprises no additional components outside of the valve 26 by comparison with a conventional control device for a cylinder that operates on just one pressure. Indeed, by comparison with a conventional control device, only the valve is modified, through the provision of a distribution device as described hereinabove.

This distribution device makes it possible to control the establishment of fluidic communication between chambers of the cylinder and the first and second sources of actuating fluid and between the chambers and the reservoir or reservoirs of actuating fluid using just one moving part within the valve. In this way it can be ensured that the establishment of communication between the chambers of the cylinder and the sources of actuating fluid always remains coherent and this establishment of communication is dependent solely on the position of the distribution device. This then guarantees correct operation of the control device because it is impossible for a chamber to be placed in communication with the incorrect source of actuating fluid. Furthermore, because of the low number of components, it becomes very easy to identify the source of any potential breakdown.

The invention claimed is:

1. A control device controlling the movement of a hydraulic cylinder, comprising a body forming a first chamber and a second chamber which are designed to receive an actuating fluid, said chambers being separated from one another by a piston able to move in the body in a first direction in which the volume of the first chamber increases while the volume of the second chamber decreases, and in a second direction in which the volume of the second chamber increases while the volume of the first chamber decreases, the control device comprising a valve comprising a body having an internal volume connected to the first chamber of the cylinder by a first hydraulic connection and to the second chamber of the cylinder by a second hydraulic connection, wherein the valve further includes a first hydraulic duct intended to be connected to a first source of actuating fluid, and a second hydraulic duct intended to be connected to a second source of actuating fluid, said hydraulic ducts being in communication with the internal volume of the valve body, said valve further comprising a distribution device movable in the internal volume of the valve body upon application of a force to an end thereof between a first position in which the distribution device places the first hydraulic connection and the first hydraulic duct in fluidic communication, and a second position in which the distribution device places the second hydraulic connection and the second hydraulic duct in fluidic communication; and wherein the distribution device prevents fluidic communication between the first hydraulic connection and the second hydraulic duct and between the second hydraulic connection and the first hydraulic duct whatever the position of said distribution device.

2. The control device as claimed in claim 1, further comprising a first source of actuating fluid, connected to the first hydraulic duct of the valve and arranged to inject the actuating fluid into the internal volume of the valve body at a first pressure, and a second source of actuating fluid connected to the second hydraulic duct and arranged to inject the actuating fluid into the internal volume of the valve body at a second pressure, the first pressure being higher than the second pressure.

3. The control device as claimed in claim 2, wherein the first pressure is substantially between 60 bar and 250 bar and in that the second pressure is substantially between 10 bar and 70 bar.

4. The control device as claimed in claim 1, further comprising at least one reservoir of actuating fluid connected to the internal volume of the valve body, the distribution device placing the second hydraulic connection in fluidic communication with said reservoir when it is in its first position, so as to discharge the actuating fluid from the second chamber of the cylinder when the piston moves in the first direction, and placing the first hydraulic connection in fluidic communication with said reservoir when it is in its second position, so as to discharge the actuating fluid from the first chamber of the cylinder when the piston moves in the second direction.

5. The control device as claimed in claim 1, wherein the valve includes a first compartment connecting the first hydraulic connection to the first hydraulic duct and a second compartment connecting the second hydraulic connection to the second hydraulic duct, the distribution device being arranged to open the first compartment and close the second compartment when it is in its first position and to open the second compartment and close the first compartment when it is in its second position.

6. The control device as claimed in claim 1, wherein the valve includes means of controlling the movement of the distribution device between its first and its second positions, said means comprising thrust means that provides an actuating force to push the distribution device from its first position toward its second position and restraining means that provides a counter force from a spring at an opposite end of the distribution device to exert restraint on the distribution device tending to return it toward its first position.

7. A system for controlling the movement of a ring gate of a hydraulic machine having a runner, the ring gate defining a closed contour and being able to move between a position of opening and a positioning of closing at least one pipeline supplying the runner with water, the system comprising at least one hydraulic cylinder, comprising a body forming a first chamber and a second chamber which are designed to receive an actuating fluid, said chambers being separated from one another by a piston able to move in the body in a first direction in which the volume of the first chamber increases while the volume of the second chamber decreases, and in a second direction in which the volume of the second chamber increases while the volume of the first chamber decreases, a rod being connected to said piston and to the ring gate so that movement of the piston in its first direction leads to a movement of the ring gate toward its open position and movement of the piston in its second direction leads to movement of the ring gate toward its closed position; said system comprising a control device as claimed in claim 1, the first hydraulic connection of said device being connected to the first chamber of said cylinder and the second hydraulic connection of said device being connected to the second chamber of said cylinder so as to control the movement of the piston in the first direction and in the second direction through movement of the distribution device between its first and its second positions.

8. The control system as claimed in claim 7, further comprising a plurality of hydraulic cylinders, of which the rods are connected to the ring gate and are distributed around the perimeter of said ring gate, the movement of each hydraulic cylinder being controlled by a control device as claimed in claim 1.

9. A hydraulic machine of the turbine, pump or turbine-pump type, comprising a runner and a ring gate able to move between a position of opening and a position of closing at least one pipeline supplying the runner with water, and a control system as claimed in claim 7.

* * * * *